(12) United States Patent
Nishi et al.

(10) Patent No.: US 8,882,090 B2
(45) Date of Patent: Nov. 11, 2014

(54) FLUID-FILLED TYPE VIBRATION DAMPING DEVICE

(71) Applicants: Tokai Rubber Industries, Ltd., Komaki (JP); Honda Motor Co., Ltd., Tokyo (JP)

(72) Inventors: Naoki Nishi, Nagoya (JP); Mutsuki Nawaji, Komaki (JP); Masataka Hirano, Wako (JP); Daisuke Fukunaga, Wako (JP)

(73) Assignees: Tokai Rubber Industries, Ltd., Komaki-shi (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/708,350

(22) Filed: Dec. 7, 2012

(65) Prior Publication Data

US 2013/0154171 A1    Jun. 20, 2013

(30) Foreign Application Priority Data

Dec. 14, 2011    (JP) .................................. 2011-273067

(51) Int. Cl.
| | | |
|---|---|---|
| *F16F 13/26* | (2006.01) | |
| *F16F 13/10* | (2006.01) | |
| *F16F 13/08* | (2006.01) | |

(52) U.S. Cl.
CPC ................ *F16F 13/08* (2013.01); *F16F 13/106* (2013.01)
USPC .................................................... 267/140.13

(58) Field of Classification Search
USPC ................................ 267/140.11, 140.13, 219
See application file for complete search history.

(56) References Cited

U.S. PATENT DOCUMENTS

| | | | | |
|---|---|---|---|---|
| 5,386,977 | A * | 2/1995 | Quast ........................ | 267/140.13 |
| 6,220,584 | B1 * | 4/2001 | Meyer ....................... | 267/140.13 |
| 6,264,181 | B1 * | 7/2001 | Muramatsu et al. ..... | 267/140.14 |
| 6,311,963 | B1 * | 11/2001 | Suzuki et al. ............ | 267/140.13 |

(Continued)

FOREIGN PATENT DOCUMENTS

| | | |
|---|---|---|
| JP | U 63-185938 | 11/1988 |
| JP | A 6-109063 | 4/1994 |

(Continued)

OTHER PUBLICATIONS

Nov. 25, 2013 Office Action issued in Japanese Patent Application No. 2011-273067 (with partial translation).

(Continued)

*Primary Examiner* — Christopher Schwartz
(74) *Attorney, Agent, or Firm* — Oliff PLC (57) ABSTRACT

A fluid-filled type vibration damping device including a partition member having a housing space, and a movable plate housed within the housing space so that displacement thereof is limited by abutment against inside wall faces of the housing space. Abutted sloping faces are defined by outside peripheral portions of the inside wall faces of the housing space situated in opposition in an axial direction while sloping axially outside going towards an inner peripheral side. An outside peripheral abutting portion formed of a rubber elastic body is provided to an outside peripheral portion of the movable plate, and abutting sloping faces are defined by opposite faces of the outside peripheral abutting portion that slope axially outside going towards the inner peripheral side. The abutted sloping faces and the abutting sloping faces have different slope angles so as to slope relative to each other.

10 Claims, 5 Drawing Sheets

(56) References Cited

U.S. PATENT DOCUMENTS

| | | | |
|---|---|---|---|
| 6,910,683 B2 * | 6/2005 | Itoh et al. | 267/140.13 |
| 2009/0243171 A1 | 10/2009 | Nanno et al. | |
| 2010/0072683 A1 * | 3/2010 | Saito et al. | 267/140.13 |
| 2011/0101581 A1 * | 5/2011 | Kubo et al. | 267/140.13 |
| 2011/0198149 A1 | 8/2011 | Toba | |

FOREIGN PATENT DOCUMENTS

| | | |
|---|---|---|
| JP | A-2004-069005 | 3/2004 |
| JP | A 2005-188724 | 7/2005 |
| JP | A-2008-281118 | 11/2008 |
| JP | A-2009-243510 | 10/2009 |
| JP | A 2009-264524 | 11/2009 |
| JP | A-2010-031990 | 2/2010 |
| JP | A-2010-169121 | 8/2010 |

OTHER PUBLICATIONS

Jun. 30, 2014 Office Action issued in Japanese Patent Application No. 201210546274.1 w/partial translation.

* cited by examiner

FLUID-FILLED TYPE VIBRATION DAMPING DEVICE

INCORPORATED BY REFERENCE

The disclosure of Japanese Patent Application No. 2011-273067 filed on Dec. 14, 2011 including the specification, drawings and abstract is incorporated herein by reference in its entirety.

BACKGROUND OF THE INVENTION

1. Field of the Invention

The present invention relates generally to a vibration damping device for use in an automotive engine mount or the like, for example, and more particularly, to a fluid-filled type vibration damping device adapted to utilize vibration damping effect exhibited based on flow action of a non-compressible fluid filling the interior.

2. Description of the Related Art

Conventionally, there are known vibration damping devices designed for installation between components that make up a vibration transmission system such as a power unit and a vehicle body, in order to provide vibration damping linkage or vibration damping support between the components. Such vibration damping devices have a structure in which a first mounting member mounted onto one component of the vibration transmission system and a second mounting member mounted onto the other component of the vibration transmission system are elastically connected by a main rubber elastic body.

Moreover, with the aim of further enhancing the vibration damping ability or the like, there have also been proposed fluid-filled type vibration damping devices adapted to utilize vibration damping effect based on flow action of a fluid filling the interior. Such fluid-filled type vibration damping devices include a partition member supported by the second mounting member, a pressure-receiving fluid chamber and an equilibrium fluid chamber formed on either side of the partition member, and an orifice passage interconnecting the pressure-receiving fluid chamber and the equilibrium fluid chamber. Such a device is disclosed in Japanese Unexamined Patent Publication No. JP-A-2009-243510, for example.

In some cases, the fluid-filled type vibration damping device employs a movable plate for switching between permitting and limiting of the fluid flow depending on the input vibration. The movable plate is housed within a housing space formed in the partition member and allowed tiny displacement in the axial direction, while receiving on one side thereof a fluid pressure of the pressure-receiving fluid chamber and on the other side thereof a fluid pressure of the equilibrium fluid chamber. At times of vibration input with a small amplitude, fluid flow will be permitted through the tiny displacement of the movable plate within the housing space. Meanwhile, at times of vibration input with a large amplitude, the movable plate will be pressed against the inside wall face of the housing space, thereby limiting the fluid flow.

However, such a movable plate may cause a problem of generating striking noises by striking against the wall face of the housing space during input of a large-amplitude vibration. In particular, the movable plate abuts with a large surface area during initial abutment, making a heavy impact force by the abutment. Thus, there was a problem that a large striking noise would be generated.

SUMMARY OF THE INVENTION

It is therefore one object of this invention to provide a fluid-filled type vibration damping device of novel construction which is able to reduce striking noise generated by abutment of the movable plate against the wall of the housing space.

Specifically, a first mode of the present invention provides a fluid-filled type vibration damping device including: a first mounting member; a second mounting member having a tubular shape; a main rubber elastic body elastically connecting the first and second mounting members; a partition member having a housing space and supported by the second mounting member; a pressure-receiving fluid chamber situated at one side of the partition member in an axial direction and whose wall is partially defined by the main rubber elastic body; an equilibrium fluid chamber situated at another side of the partition member in the axial direction and whose wall is partially defined by a flexible film; an orifice passage interconnecting the pressure-receiving fluid chamber and the equilibrium fluid chamber; and a movable plate that receives on one side thereof a fluid pressure of the pressure-receiving fluid chamber and on another side thereof a fluid pressure of the equilibrium fluid chamber, and adapted to absorb pressure fluctuations in the pressure-receiving fluid chamber through tiny displacement, wherein the movable plate is housed within the housing space of the partition member so that an amount of displacement of the movable plate is limited by abutment of the movable plate against inside wall faces of the housing space; wherein abutted sloping faces are defined by outside peripheral portions of the inside wall faces of the housing space that are situated in opposition in the axial direction and that slope axially outside going towards an inner peripheral side; wherein an outside peripheral abutting portion formed of a rubber elastic body is provided to an outside peripheral portion of the movable plate, and abutting sloping faces are defined by opposite faces of the outside peripheral abutting portion that slope axially outside going towards the inner peripheral side; and wherein the abutted sloping faces of the housing space and the abutting sloping faces of the movable plate have different slope angles so as to slope relative to each other.

With the fluid-filled type vibration damping device constructed according to the first mode of the present invention, at times of input of large-amplitude vibration or the like, striking noise generated by abutment of the movable plate against the inside wall faces of the housing space will be reduced. Specifically, the outside peripheral portions of the inside wall faces of the housing space and the opposite faces of the outside peripheral abutting portion of the movable plate, which are adapted to come into abutment against each other through displacement of the movable plate, slope relative to each other. Accordingly, the abutting area in the initial phase of abutment between the housing space and the outside peripheral abutting portion is kept to a minimum, thereby decreasing impact force during initial abutment. Therefore, it is possible to reduce the striking noise generated by abutment between the movable plate and the inside wall faces of the housing space.

Moreover, the outside peripheral abutting portion of the movable plate adapted to abut against the inside wall faces of the housing space is formed of a rubber elastic body. Thus, the impact force during the abutment will be decreased based on cushioning action through elastic deformation of the rubber elastic body, so that the generated striking noise will be reduced.

A second mode of the present invention provides the fluid-filled type vibration damping device according to the first mode wherein a support projection that projects in a thickness direction is provided at an outside peripheral edge of the outside peripheral abutting portion of the movable plate, and the support projection is clasped between the abutted sloping faces of the housing space.

According to the second mode, with the support projection clasped between opposed faces of the abutted sloping faces, the movable plate is retained at the approximately center in the direction of displacement within the housing space. Therefore, during displacement of the movable plate, the amount of displacement of the movable plate for abutting against the inside wall face of the housing space is made small. Consequently, relative speed of the movable plate during abutment against the inside wall face of the housing space will be minimized, thereby decreasing impact energy during the abutment so as to prevent occurrence of striking noise.

A third mode of the present invention provides the fluid-filled type vibration damping device according to the first or second mode wherein an abutting projection that projects in a thickness direction is provided in the outside peripheral abutting portion of the movable plate, and a distance between a projecting distal end of the abutting projection and the abutted sloping face facing the abutting projection is smaller than a distance between other portions of the outside peripheral abutting portion and the abutted sloping face.

According to the third mode, during displacement of the movable plate, the abutting projection will come into abutment against the abutted sloping face of the housing space before the other portions of the abutting sloping face will do. Thus, abutting area during initial abutment of the movable plate against the abutted sloping face is made smaller, thereby reducing striking noise. Moreover, the speed of abutment between the abutting sloping faces and the abutted sloping faces will be decreased owing to cushioning action utilizing the spring of the abutting projection formed of a rubber elastic body. This will ameliorate impact force during the abutment and reduce the striking noise.

A fourth mode of the present invention provides the fluid-filled type vibration damping device according to any one of the first through third modes wherein a separated recess that opens onto at least one of the abutting sloping faces is formed in the outside peripheral abutting portion of the movable plate, and a distance between a bottom face of the separated recess and the abutted sloping face facing the separated recess is greater than a distance between other portions of the outside peripheral abutting portion and the abutted sloping face.

According to the fourth mode, during displacement of the movable plate, the separated recess will come into abutment against the abutted sloping face of the housing space later than the other portions of the abutting sloping face will do. Thus, abutting area during initial abutment of the movable plate against the abutted sloping face is made smaller, thereby reducing striking noise. By employing the structure described in the third mode in combination, the movable plate will abut against the abutted sloping face in a stepwise manner. This makes it possible to more effectively decrease the impact force, so that striking noise during the abutment can be more advantageously reduced.

A fifth mode of the present invention provides the fluid-filled type vibration damping device according to any one of the first through fourth modes wherein a sealing face that extends in an annular form in a circumferential direction is provided at an outside peripheral end edge of the outside peripheral abutting portion of the movable plate, and through displacement of the movable plate, the sealing face is adapted to abut against the inside wall face of the housing space facing the sealing face about an entire circumference.

According to the fifth mode, when the movable plate comes into abutment against the inside wall face of the housing space through its displacement, the sealing face abuts against the inside wall face of the housing space about the entire circumference. This will prevent fluid flow through a gap between the movable plate and the wall of the housing space. Therefore, internal pressure fluctuations in the pressure-receiving fluid chamber will be efficiently induced so as to obtain sufficient amount of the fluid flowing through the orifice passage, thereby effectively achieving vibration damping action based on the flow action of a fluid.

A sixth mode of the present invention provides the fluid-filled type vibration damping device according to any one of the first through fifth modes wherein the movable plate comprises a rigid movable plate body and the outside peripheral abutting portion anchored to an outside peripheral portion of the movable plate body.

According to the sixth mode, the movable plate includes the rigid movable plate body, so that the movable plate is prevented from deformation due to the action by the fluid pressure. Thus, in the state where the movable plate is in abutment against the inside wall face of the housing space, internal pressure fluctuations in the pressure-receiving fluid chamber will be efficiently induced. Consequently, vibration damping action based on the flow action of a fluid will be effectively obtained.

A seventh mode of the present invention provides the fluid-filled type vibration damping device according to the sixth mode wherein the movable plate body of the movable plate is covered by a rubber elastic body that is integrally formed with the outside peripheral abutting portion, and the movable plate is made thinner in an inside peripheral portion rather than in the outside peripheral portion to which the outside peripheral abutting portion is provided.

According to the seventh mode, by being covered with the rubber elastic body including the outside peripheral abutting portion, the movable plate body is kept from corrosion or the like caused by being exposed to the non-compressible fluid, thereby improving durability. Moreover, since the inside peripheral portion of the movable plate is made thinner than the outside peripheral abutting portion, reduced weight and reduced cost of the movable plate can be realized.

According to the present invention, the abutting faces of the movable plate and the housing space are respectively defined by the abutting sloping faces and the abutted sloping faces, both of which slope with respect to the axis-perpendicular plane. Besides, the slope angles of the abutting sloping faces and the abutted sloping faces are made different from each other, so that the abutting sloping faces and the abutted sloping faces slope relative to each other. With this arrangement, the abutting area during initial abutment between the abutting sloping faces and the abutted sloping faces is kept to a minimum, whereby impact force during the abutment will be ameliorated. Therefore, it is possible to reduce striking noise generated by abutment between the movable plate and the inside wall faces of the housing space.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
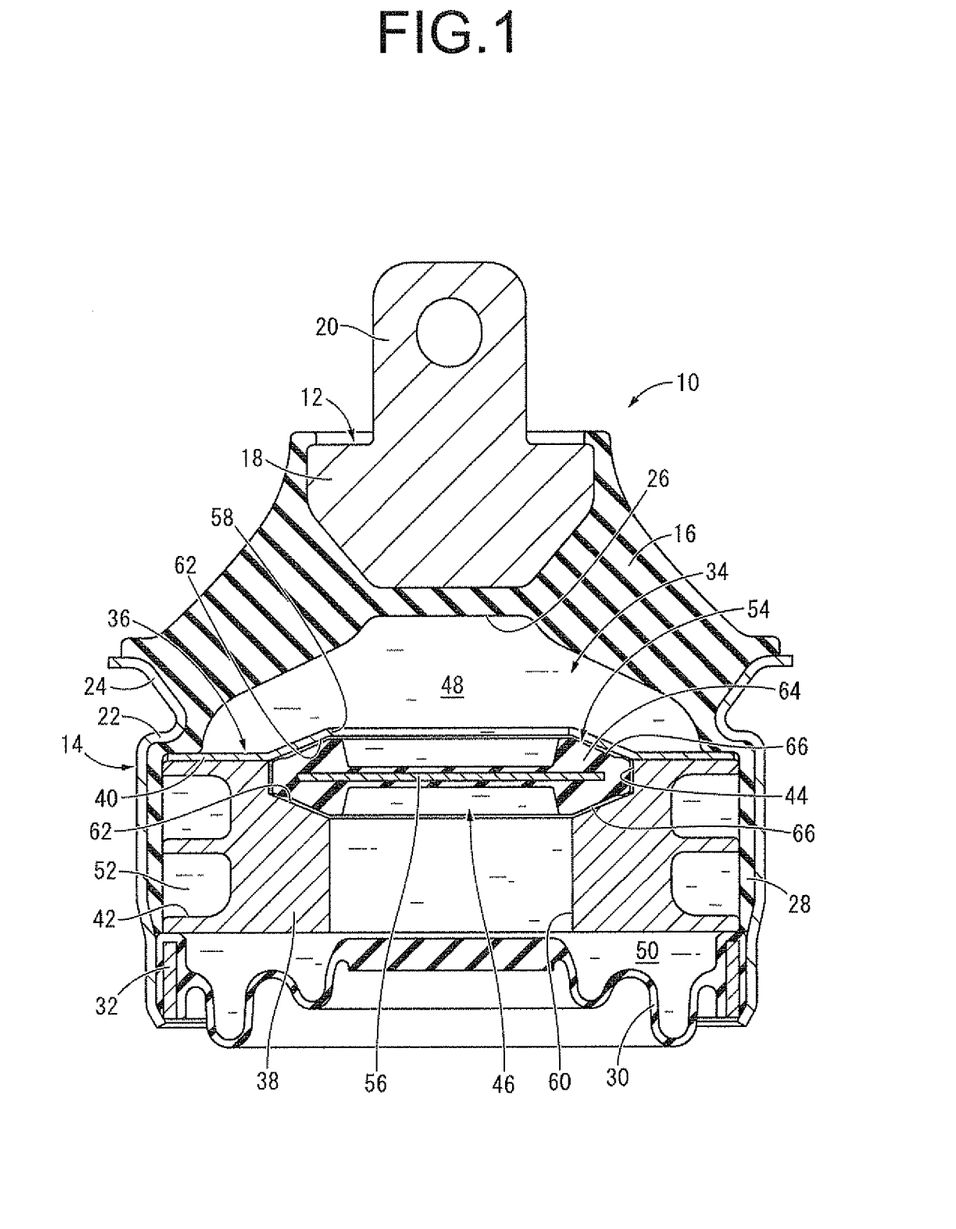
FIG. 1 is an elevational view in axial or vertical cross section of a fluid-filled type vibration damping device in the form of an engine mount as a first embodiment of the present invention.

Referring to FIG. 1, there is depicted an automotive engine mount 10 according to a first embodiment of a fluid-filled type vibration damping device constructed in accordance with the present invention. The engine mount 10 has a construction in which a first mounting member 12 and a second mounting member 14 are elastically connected by a main rubber elastic body 16. In the description hereinbelow, as a general rule, the vertical direction refers to the vertical direction in FIG. 1.

Described more specifically, the first mounting member 12 is a high rigidity component made of materials such as iron, aluminum alloy or the like. The first mounting member 12 is integrally equipped with an anchor portion 18 of generally inverted frustoconical shape and a mounting plate 20 of plate shape that projects upward from the anchor portion 18. The mounting plate 20 is perforated by a bolt hole in the thickness direction.

The second mounting member 14 is a high rigidity component made of material similar to the first mounting member 12, and has a thin-walled, large-diameter, generally cylindrical shape. Additionally, the second mounting member 14 includes a shoulder portion 22 projecting peripherally inward and a tapered portion 24 projecting and flaring upward from the inner peripheral edge of the shoulder portion 22.

The first mounting member 12 is positioned coaxially with the upper opening of the second mounting member 14 while being spaced apart therefrom by a prescribed distance, and the first mounting member 12 and the second mounting member 14 are elastically connected by the main rubber elastic body 16. The main rubber elastic body 16 has a thick-walled, large-diameter, generally frustoconical shape. The anchor portion 18 of the first mounting member 12 is bonded by vulcanization to the small-diameter side end of the main rubber elastic body 16, while the tapered portion 24 of the second mounting member 14 is superposed against and bonded by vulcanization to the outer circumferential face of the large-diameter side end of the main rubber elastic body 16. In the present embodiment, the main rubber elastic body 16 takes the form of an integrally vulcanization molded component incorporating the first mounting member 12 and the second mounting member 14.

Furthermore, the main rubber elastic body 16 includes a large-diameter recess 26 formed therein. The large-diameter recess 26 is a recess that opens onto the large-diameter end face of the main rubber elastic body 16, and has an inverted, generally bowl shape.

Besides, the main rubber elastic body 16 includes a seal rubber layer 28 integrally formed therewith. The seal rubber layer 28 has a thin-walled, large-diameter, generally cylindrical shape, and extends axially downward from the outside peripheral edge of the main rubber elastic body 16 while being bonded by vulcanization to the inner circumferential face of the second mounting member 14.

Moreover, to the integrally vulcanization molded component of the main rubber elastic body 16, a flexible film 30 is attached. The flexible film 30 is a rubber film of thin-walled, large-diameter, generally circular disk shape, and has an ample slack in the axial direction. To the outside peripheral edge of the flexible film 30, a tubular holding member 32 is bonded by vulcanization. After the holding member 32 is inserted into the lower opening of the second mounting member 14, the second mounting member 14 is subjected to a diameter reduction process such as 360-degree radial compression. By so doing, the holding member 32 is secured fitting into the second mounting member 14 and the flexible film 30 is disposed so as to close off the lower opening of the second mounting member 14.

In this way, the flexible film 30 is attached to the integrally vulcanization molded component. Accordingly, a fluid chamber 34 isolated from the outside is formed between axially opposed faces of the main rubber elastic body 16 and the flexible film 30, and is filled with a non-compressible fluid. While no particular limitation is imposed as to the non-compressible fluid filling the fluid chamber 34, preferred examples are water, alkylene glycols, polyalkylene glycols, silicone oil, and mixtures of these. In terms of efficiently achieving vibration damping action based on flow action of the fluid described later, a low-viscosity fluid having viscosity of 0.1 Pa·s or lower is especially preferred.

Inside the fluid chamber 34, a partition member 36 is housed and supported by the second mounting member 14. The partition member 36 has a thick-walled, generally circular disk shape overall, and has a construction in which a partition member body 38 and a cover member 40 are superposed against each other in the vertical direction.

The partition member body 38 is a rigid component made of metal such as aluminum alloy, or synthetic resin, or other material, and has a thick-walled, large-diameter, generally circular disk shape. The partition member body 38 includes in its outside peripheral portion a slot 42 that extends a prescribed length in the circumferential direction while opening onto the outer circumferential face of the partition member body 38. The partition member body 38 further includes in its diametrical center section a housing recess 44 that opens onto the upper face of the partition member body 38 and has a generally circular shape in plan view.

The cover member 40 is a rigid component similar to the partition member body 38, and has a thin-walled, large-diameter, generally circular disk shape. The cover member 40 is superposed against the upper face of the partition member body 38. By so doing, the opening of the housing recess 44 of the partition member body 38 is closed off by the cover member 40 so as to form a housing space 46 between the partition member body 38 and the cover member 40 utilizing the housing recess 44.

The partition member 36 constructed as above is housed within the fluid chamber 34 and supported by the second mounting member 14. Specifically, the partition member 36 is inserted into the second mounting member 14 with its outer circumferential face superposed against the second mounting member 14 via the seal rubber layer 28. Concomitantly, the second mounting member 14 is subjected to the diameter reduction process, whereby the partition member 36 is secured fitting into the second mounting member 14.

With the partition member 36 supported by the second mounting member 14 while being disposed within the fluid chamber 34 so as to spread in the axis-perpendicular direction, the fluid chamber 34 is bifurcated into upper and lower parts by the partition member 36. Accordingly, to the axially upper side of the partition member 36 there is formed a pressure-receiving fluid chamber 48 whose wall is partially defined by the main rubber elastic body 16 and in which internal pressure fluctuations are adapted to be induced at times of vibration input. Meanwhile, to the axially lower side of the partition member 36 there is formed an equilibrium fluid chamber 50 whose wall is partially defined by the flexible film 30 and that readily permits changes in volume.

In addition, the opening on the outer peripheral side of the slot 42 of the partition member 36 is covered fluid-tightly by the second mounting member 14 via the seal rubber layer 28, thereby providing a tunnel-like passage. One end of the tunnel-like passage communicates with the pressure-receiving fluid chamber 48 while the other end communicates with the equilibrium fluid chamber 50. With this arrangement, an orifice passage 52 interconnecting the pressure-receiving fluid chamber 48 and the equilibrium fluid chamber 50 is formed in the partition member 36 utilizing the slot 42. For the orifice passage 52, the tuning frequency, which is the resonance frequency of the flowing fluid, is tuned by adjusting the ratio (A/L) of passage cross sectional area (A) and passage length (L) in consideration of wall spring rigidity of the pressure-receiving fluid chamber 48 and the equilibrium fluid chamber 50. In the present embodiment, the tuning frequency of the orifice passage 52 is tuned to a low frequency of around 10 Hz corresponding to engine shake.

Figure 2:
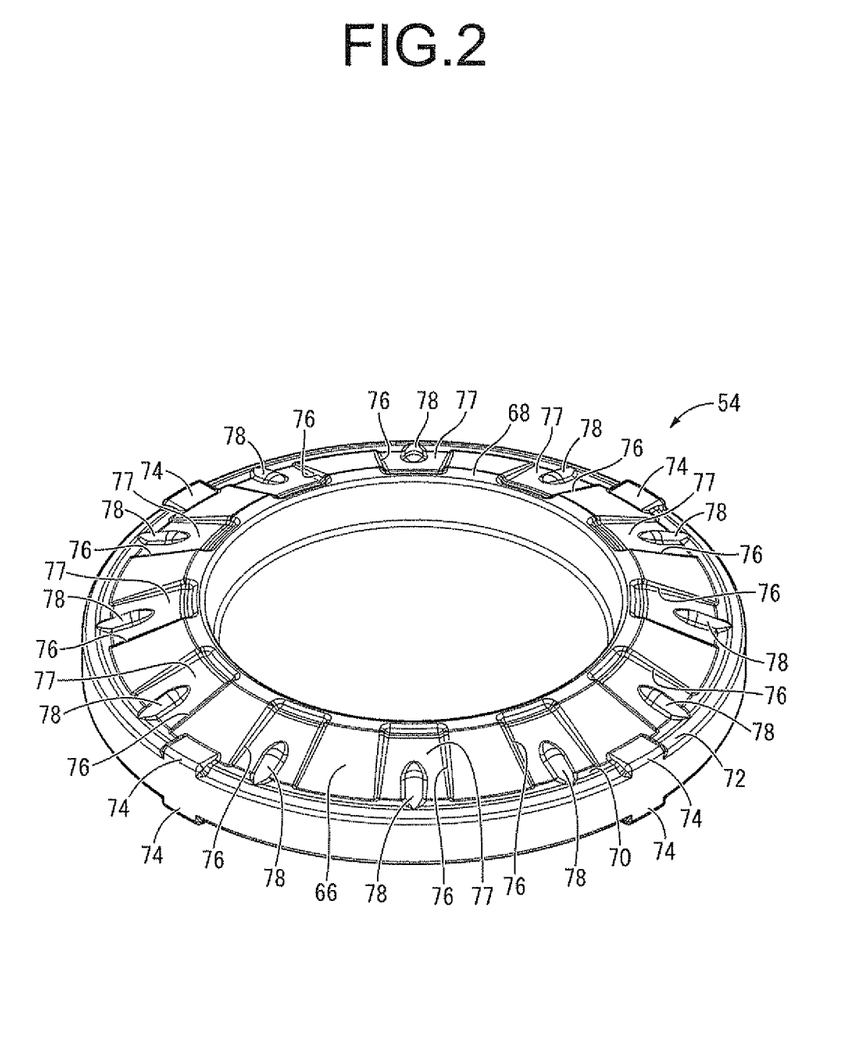
FIG. 2 is a perspective view of a movable plate of the engine mount shown in FIG. 1.
Figure 3:
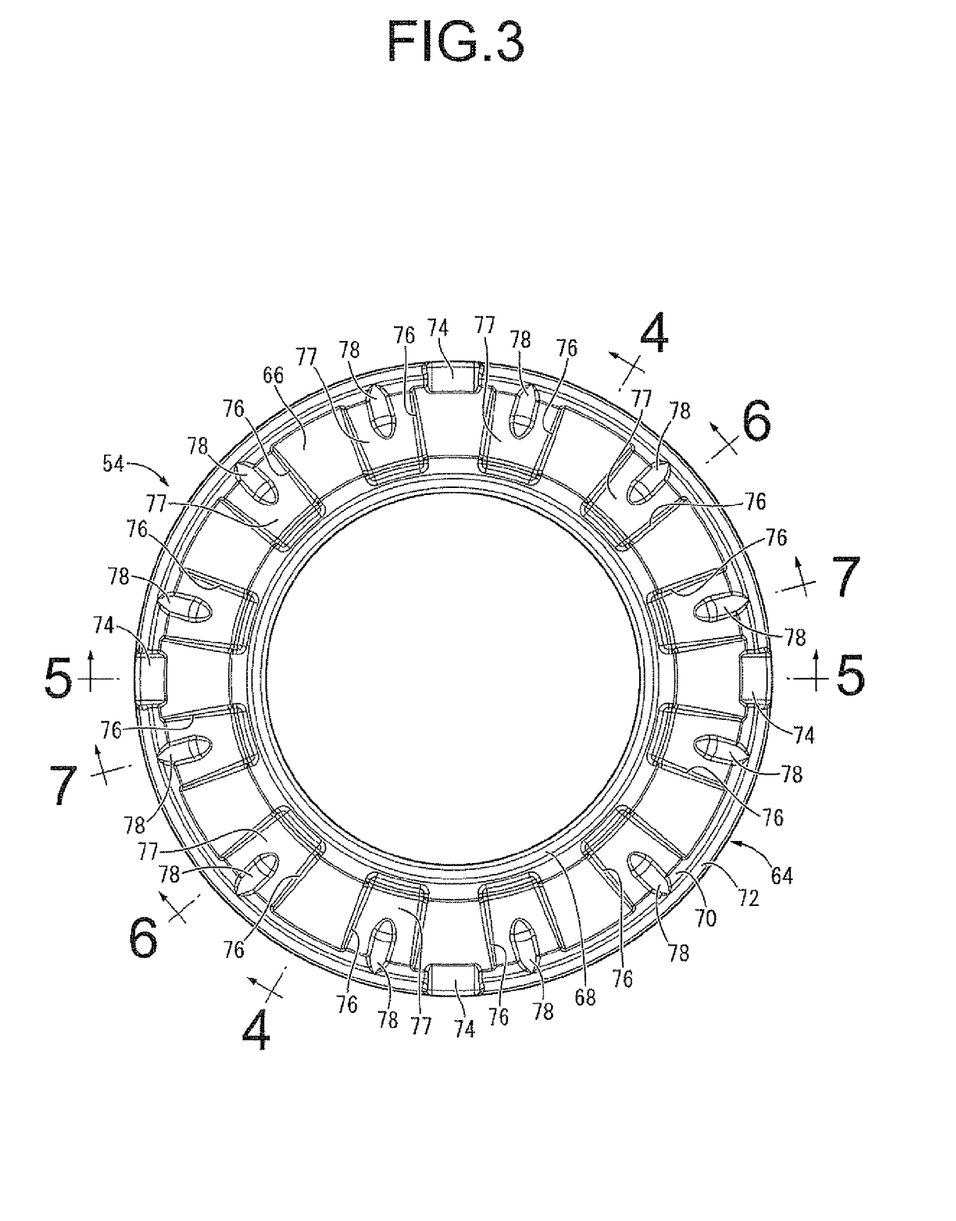
FIG. 3 is a top plane view of the movable plate shown in FIG. 2.
Figure 4:
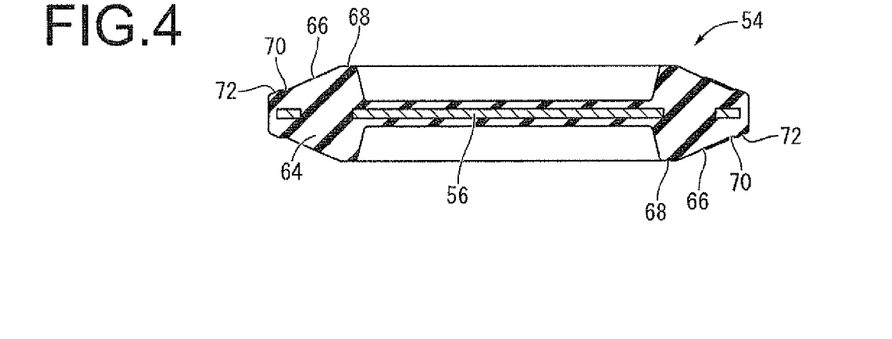
FIG. 4 is a cross sectional view taken along line 4-4 of FIG. 3.
Figure 5:
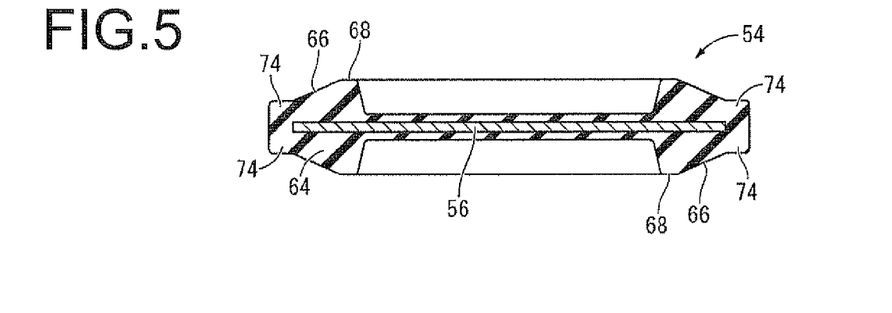
FIG. 5 is a cross sectional view taken along line 5-5 of FIG. 3.
Figure 6:
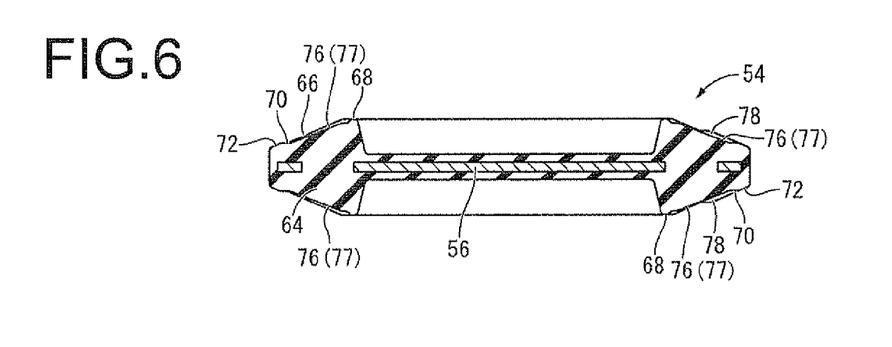
FIG. 6 is a cross sectional view taken along line 6-6 of FIG. 3.
Figure 7:
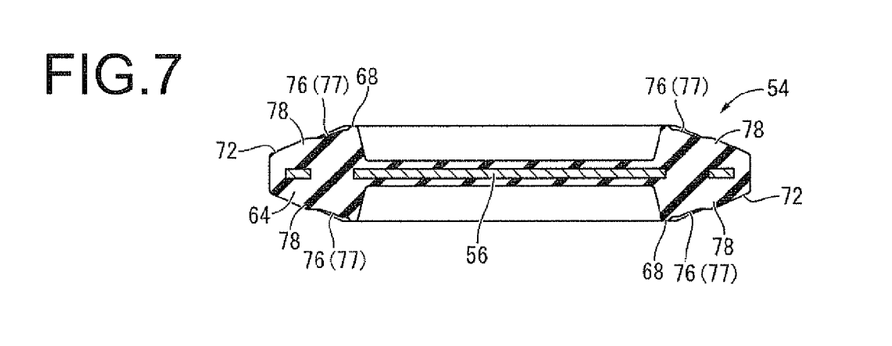
FIG. 7 is a cross sectional view taken along line 7-7 of FIG. 3.

Furthermore, a movable plate 54 is housed within the housing space 46 of the partition member 36. As depicted in FIGS. 2 and 3, the movable plate 54 has a generally circular disk shape overall, and has a construction in which a surface of a rigid movable plate body 56 is covered by a rubber elastic body. The movable plate 54 receives on its upper face the fluid pressure of the pressure-receiving fluid chamber 48 via a through hole 58 formed in the cover member 40 at the portion which constitutes the upper wall of the housing space 46. Meanwhile, the movable plate 54 receives on its lower face the fluid pressure of the equilibrium fluid chamber 50 via a center hole 60 formed in the partition member body 38 at the portion which constitutes the lower wall of the housing space 46. With this arrangement, during input of high-frequency, small-amplitude vibration, the movable plate 54 is adapted to undergo tiny displacement in the axial direction (in the plate thickness direction) based on relative differential between the fluid pressure in the pressure-receiving fluid chamber 48 and the fluid pressure in the equilibrium fluid chamber 50. Consequently, the fluid pressure in the pressure-receiving fluid chamber 48 is adapted to be transmitted to the equilibrium fluid chamber 50 and absorbed through the tiny displacement. As a result, during input of high-frequency, small-amplitude vibration, vibration damping effect (low dynamic spring effect) will be exhibited based on the liquid pressure-absorbing action through the tiny displacement of the movable plate 54. Thus, vibration damping ability against idling vibration, driving rumble or the like is obtained. Note that the amount of displacement of the movable plate 54 in the axial direction is limited by abutment of the movable plate 54 against the inside wall faces of the housing space 46 situated on axially opposite sides.

In this respect, outside peripheral portions of the inside wall faces of the housing space 46 that are situated in opposition in the axial direction define abutted sloping faces 62 having tapered contours that slope axially outside going towards the inner peripheral side. More specifically, the base wall face of the housing recess 44 of the partition member body 38 defines the lower abutted sloping face 62 at the portion outside the center hole 60. Meanwhile, the lower face of the inner peripheral edge of the cover member 40 defines the upper abutted sloping face 62 at the portion projecting above the opening of the housing recess 44. Since these upper and lower abutted sloping faces 62, 62 are provided in the outside peripheral portion of the housing space 46, the axial dimension of the outside peripheral portion of the housing space 46 progressively becomes greater going towards the inner peripheral side. In the present embodiment, the abutted sloping faces 62 extend so as to slope at the generally unchanging slope angle: α with respect to an imaginary plane that spreads in the axis-perpendicular direction (the axis-perpendicular plane). Also, the inner peripheral edge of the cover member 40 where the upper abutted sloping face 62 is provided has tapered contours that slope upward going towards the inner peripheral side, so that the cover member 40 has generally unchanging thickness throughout its entirety.

As depicted in FIGS. 4 through 7, the movable plate 54 comprises a rigid movable plate body 56 of generally circular disk shape and an outside peripheral abutting portion 64 anchored to the outside peripheral portion of the movable plate body 56. The outside peripheral abutting portion 64 is an annular rubber elastic body that projects to opposite sides in the thickness direction from the outside peripheral portion of the movable plate body 56, and is integrally formed with a rubber layer that covers the surface of the movable plate body 56. In addition, the outside peripheral abutting portion 64 becomes thicker going towards the inner peripheral side with a height of projection towards axially outside made progressively greater. Meanwhile, in the movable plate 54, the inside peripheral portion located inside the outside peripheral abutting portion 64 has a construction in which the surface of the movable plate body 56 is covered by the thin-walled rubber elastic body (rubber layer), and is made thinner than the outside peripheral portion to which the outside peripheral abutting portion 64 is provided.

Figure 8:
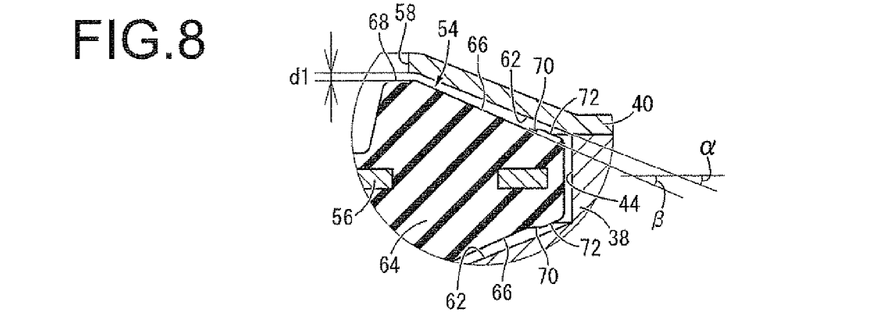
FIG. 8 is an enlarged cross sectional view of a principle part of the movable plate shown in FIG. 4.

Described more specifically, with respect to the outside peripheral abutting portion 64, opposite faces situated radially medial section thereof are constituted by abutting sloping faces 66. As depicted in FIG. 8, the abutting sloping faces 66 are faces having tapered contours that slope outside in the axial direction going towards the inner peripheral side. The axial direction corresponds to the direction of displacement of the movable plate 54 as well as the plate thickness direction. It should be appreciated that the slope angle: β of the abutting sloping faces 66 with respect to the axis-perpendicular plane is different from the slope angle: α of the abutted sloping faces 62, so that the abutting sloping faces 66 extend so as to slope relative to the abutted sloping faces 62.

In addition, to the inner peripheral side of the abutting sloping faces 66 there are formed inside peripheral abutting faces 68 that extend in the generally axis-perpendicular direction. Besides, to the outer peripheral side of the abutting sloping faces 66 there are formed outside peripheral abutting faces 70 that extend in the generally axis-perpendicular direction. Further, to the outer peripheral side of the outside peripheral abutting faces 70 there are formed sealing faces 72 that progressively slope axially inside going towards the outer peripheral side. The sealing faces 72 extend in an annular form in the circumferential direction at the outside peripheral end edges of the outside peripheral abutting portion 64 of the movable plate 54, and are formed with approximately the same slope angle as that of the inside wall faces of the housing space 46 situated in opposition in the axial direction.

Figure 9:
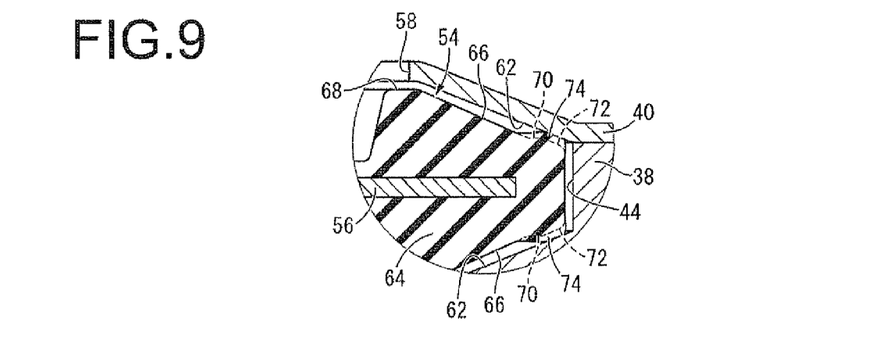
FIG. 9 is an enlarged cross sectional view of a principle part of the movable plate shown in FIG. 5.

Moreover, at four locations along the circumference of the outside peripheral abutting portion 64 there are integrally formed support projections 74. As depicted in FIG. 9, the support projections 74 project in the thickness direction (in the plate thickness direction of the movable plate 54) at the outside peripheral edge of the outside peripheral abutting portion 64. Accordingly, the thickness dimension of the outside peripheral edge of the outside peripheral abutting portion 64 is partially made greater in the section where the support projections 74 are formed.

Figure 10:
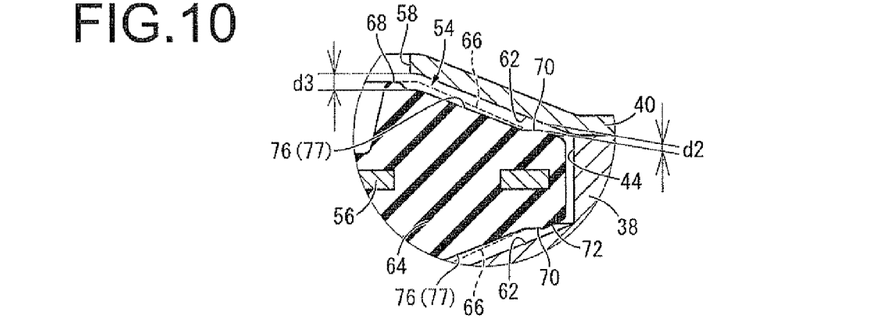
FIG. 10 is an enlarged cross sectional view of a principle part of the movable plate shown in FIG. 6.

Besides, along the circumference of the outside peripheral abutting portion 64 there are formed a plurality of separated recesses 76. As depicted in FIG. 10, the separated recesses 76 are formed in the radially medial section of the outside peripheral abutting portion 64 where the abutting sloping faces 66 are provided, and open onto the abutting sloping faces 66. In other words, along the same given circumference, the thickness dimension of the outside peripheral abutting portion 64 is partially made smaller in the section where the separated recesses 76 are formed so as to make the outside peripheral abutting portion 64 thinner. While no particular limitation is imposed as to the number and shape of the separated recesses 76, in the present embodiment, twelve separated recesses 76 are formed at equal intervals in a spoke-wise fashion.

Figure 11:
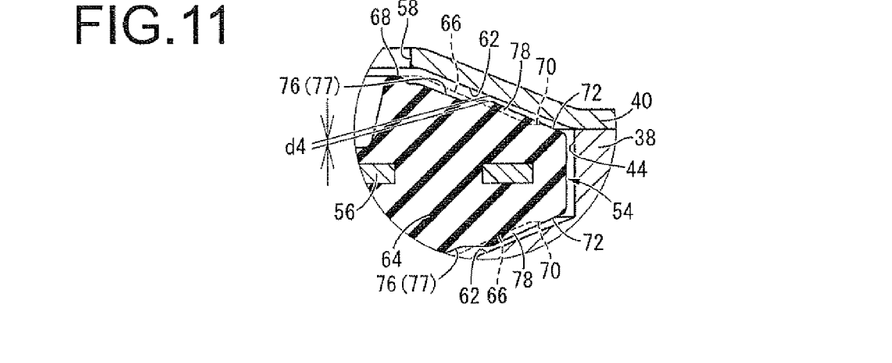
FIG. 11 is an enlarged cross sectional view of a principle part of the movable plate shown in FIG. 7.

In addition, the separated recesses 76 respectively have abutting projections 78. As depicted in FIG. 11, the abutting projections 78 are projections formed of a rubber elastic body and project outward in the thickness direction of the movable plate 54 from the outside peripheral portion of bottom faces 77 in the circumferentially center section of the separated recesses 76. Also, the abutting projections 78 have a radially elongated, generally oval shape in plan view, as well as tapered contours whose cross-sectional area progressively becomes smaller going towards their projecting distal end.

The movable plate 54, which incorporates the outside peripheral abutting portion 64 of the above construction, is disposed within the housing space 46 of the partition member 36. Specifically, the movable plate 54 is housed so as to spread in the axis-perpendicular direction with respect to the housing space 46, and the support projections 74 of the movable plate 54 are clasped between opposed faces of the upper and lower abutted sloping faces 62, 62 of the housing space 46. With this arrangement, in the stationary state in the absence of vibration input, the movable plate 54 is held positioned in the vertically center section of the housing space 46, and the upper and lower abutting sloping faces 66, 66 are opposed to the respective upper and lower abutted sloping faces 62, 62 with approximately the same gap. Note that the support projections 74 are not necessarily clasped and compressed between the upper and lower abutted sloping faces 62, 62. As long as the support projections 74 are situated in abutment against the abutted sloping faces 62, 62 and the movable plate 54 is positioned in the axial direction within the housing space 46, compressive deformation of the support projections 74 is not essential.

It should be appreciated that, with the movable plate 54 disposed within the housing space 46, the distance: d1 between the inside peripheral abutting faces 68 and the inside wall faces of the housing space 46 in the axial direction is smaller than the distance: d2 between the sealing faces 72 and the inside wall faces of the housing space 46 in the axial direction (d1<d2). Therefore, during displacement of the movable plate 54 in the axial direction to be described later, the inside peripheral abutting face 68 will come into abutment against the inside wall face of the housing space 46 before the sealing face 72 will do.

Moreover, the distance: d3 between the bottom faces 77 of the separated recesses 76 and the inside wall faces of the housing space 46 in the axial direction is greater than the distance: d2 between the sealing faces 72 and the inside wall faces of the housing space 46 in the axial direction (d2<d3). Therefore, during displacement of the movable plate 54 in the axial direction to be described later, the bottom faces 77 of the separated recesses 76 will come into abutment against the inside wall face of the housing space 46 after the other portions of the outside peripheral abutting portion 64 will do. That is, the distance between the separated recesses 76 and the abutted sloping faces 62 facing the separated recesses 76 is greater than the distance between the other portions of the outside peripheral abutting portion 64 and the abutted sloping faces 62.

Furthermore, the distance: d4 between the abutting projections 78 and the inside wall faces of the housing space 46 in the axial direction is smaller than the distance: d1 between the inside peripheral abutting faces 68 and the inside wall faces of the housing space 46 in the axial direction (d4<d1). Therefore, during displacement of the movable plate 54 in the axial direction to be described later, the abutting projections 78 will come into abutment against the inside wall face of the housing space 46 before the inside peripheral abutting face 68 will do. That is, the abutting projections 78 project nearer to the abutted sloping faces 62 facing the abutting projections 78 than the other portions of the outside peripheral abutting portion 64 do, having a smaller distance of separation from the abutted sloping faces 62.

The engine mount 10 constructed in the above manner is interposed between a power unit (not shown) and a vehicle body (not shown) with the first mounting member 12 secured to the power unit side and the second mounting member 14 secured to the vehicle body side.

At times of input of low-frequency, large-amplitude vibration corresponding to engine shake, relative pressure differential arises between the pressure-receiving fluid chamber 48 and the equilibrium fluid chamber 50, thereby producing fluid flow between the pressure-receiving fluid chamber 48 and the equilibrium fluid chamber 50 through the orifice passage 52. By so doing, desired vibration damping effect (high attenuating or damping action) will be exhibited on the basis of resonance action or other flow action of the flowing fluid.

In this respect, during input of large-amplitude vibration, the movable plate 54 undergoes displacement in the vertical direction depending on the relative pressure fluctuations between the pressure-receiving fluid chamber 48 and the equilibrium fluid chamber 50, so that outside peripheral abutting portion 64 comes into abutment against the inside wall face of the housing space 46 in the axial direction.

More specifically, first, the abutting projections 78 of the outside peripheral abutting portion 64 come into abutment against the abutted sloping face 62 of the housing space 46. Accordingly, in the initial phase of abutment, the outside peripheral abutting portion 64 and the housing space 46 will abut in a very small abutting area. Thus, during transition from a state of separation to a state of abutment, for which occurrence of striking noise is likely to be a problem, impact force due to the abutment will be ameliorated, thereby reducing striking noise. Note that as the amount of displacement of the movable plate 54 becomes greater, the abutting projections 78 undergo collapsing deformation in an elastic manner, so that the abutting area progressively increases while their springs become more rigid.

When the amount of elastic deformation of the abutting projections 78 becomes greater, the inside peripheral abutting face 68 of the outside peripheral abutting portion 64 comes into abutment against the inside wall face of the housing space 46 in the axial direction. This will increase the abutting area in a stepwise manner and severely limit the displacement of the movable plate 54. Note that the abutting projections 78 undergo elastic deformation and reduce the displacement speed of the movable plate 54 before abutment of the inside peripheral abutting face 68. Therefore, striking noise caused by abutment of the inside peripheral abutting face 68 against the inside wall face of the housing space 46 is reduced or avoided. In the present embodiment, the diameter of the through hole 58 of the cover member 40 is made smaller than the outside diameter of the inside peripheral abutting face 68. Thus, the outside peripheral edge of the upper inside peripheral abutting face 68 will come into abutment against the cover member 40 through upward displacement of the movable plate 54. On the other hand, the diameter of the center hole 60 of the partition member body 38 is made greater than the outside diameter of the inside peripheral abutting face 68. Therefore, the lower inside peripheral abutting face 68 will not come into abutment against the partition member body 38 during downward displacement of the movable plate 54.

When the movable plate 54 undergoes further displacement from the state of abutment between the inside peripheral abutting face 68 and the inside wall face of the housing space 46, next, the outside peripheral abutting face 70 of the outside peripheral abutting portion 64 comes into abutment against the inside wall face of the housing space 46. Accordingly, the abutting area further increases and the displacement of the movable plate 54 is more severely limited.

Moreover, through displacement of the movable plate 54, the sealing face 72 provided to the outer peripheral side of the outside peripheral abutting face 70 is pressed against the outside peripheral edge of the inside wall face of the housing space 46 facing the sealing face 72 continuously about the entire circumference. This will block the gap between the movable plate 54 and the inside wall face of the housing space 46. By so doing, at times of input of low-frequency, large-amplitude vibration, fluid pressure in the pressure-receiving fluid chamber 48 is sufficiently ensured, whereby vibration damping effect will be efficiently attained based on the flow action of a fluid exhibited through the orifice passage 52.

After abutment of the outside peripheral abutting face 70 against the inside wall face of the housing space 46, through further displacement of the movable plate 54, the abutting sloping face 66 of the movable plate 54 comes into abutment against the abutted sloping face 62 of the housing space 46. Concomitantly, in association with the displacement of the movable plate 54, the abutting area between the abutting sloping face 66 and the abutted sloping face 62 progressively increases. Therefore, the initial impact force due to abutment between the abutting sloping face 66 and the abutted sloping face 62 will be reduced, thereby decreasing striking noise caused by the abutment.

After the abutment of the abutting sloping face 66 against the abutted sloping face 62, through further displacement of the movable plate 54, the separated recesses 76 come into abutment against the abutted sloping face 62. Consequently, the abutting area between the movable plate 54 and the inside wall face of the housing space 46 still further increases, thereby even more severely limiting the displacement of the movable plate 54.

In this way, the movable plate 54 is arranged such that as the amount of its displacement within the housing space 46 in the axial direction becomes greater, the sections abutting against the inside wall face of the housing space 46 increase in a stepwise manner, while the initial abutting area of each section abutting against the inside wall face of the housing space 46 is small. This arrangement will reduce striking noise generated based on the impact force during abutment of the each section of the movable plate 54 against the inside wall face of the housing space 46.

Moreover, the abutting sloping faces 66, the separated recesses 76, and the abutting projections 78, which come into abutment against the inside wall face of the housing space 46 at different timings, are provided in plurality at equal intervals along the circumference. With this arrangement, during abutment of the abutting sloping faces 66, the bottom faces 77 of the separated recesses 76, or the abutting projections 78 against the inside wall face of the housing space 46, it is possible to prevent the movable plate 54 from tilting or the like due to abutment reaction force and abutting unexpectedly against the inside wall face of the housing space 46 accompanied by a large striking noise, or forming a gap between the movable plate 54 and the inside wall face of the housing space 46 accompanied by decrease in vibration damping effect.

Furthermore, all of the inside peripheral abutting faces 68, the outside peripheral abutting faces 70, and the sealing faces 72 extend substantially continuously in the circumferential direction. This arrangement prevents troubles of the movable plate 54 such as tilting or the like due to abutment reaction force during abutment against the housing space 46. This makes it possible to avoid a large striking noise or a gap formed between the movable plate 54 and the inside wall face of the housing space 46 that causes deterioration in vibration damping ability or the like.

Besides, the movable plate 54 is positioned at the approximately center in the axial direction within the housing space 46 by means of the support projections 74 being clasped by the partition member 36. With this arrangement, the amounts of displacement of the movable plate 54 in the axially opposite directions are approximately equal to each other, so that the amount of displacement of the movable plate 54 for abutting against the inside wall face of the housing space 46 is minimized. Accordingly, impact energy during the abutment will be decreased, thereby limiting striking noise caused by the abutment. However, the arrangement in which the movable plate 54 is positioned at the approximately center in the axial direction within the housing space 46 is not essential in the present invention. The movable plate 54 may alternatively be positioned so as to be biased towards either side in the axial direction within the housing space 46.

In addition, the movable plate 54 comprises the rigid movable plate body 56 of generally circular disk shape and the outside peripheral abutting portion 64 projecting to opposite sides in the thickness direction and anchored to the outside peripheral portion of the movable plate body 56. Accordingly, the inside peripheral portion located inside the outside peripheral abutting portion 64 has a thin-walled plate configuration in which the surface of the movable plate body 56 is covered by the rubber elastic body (rubber layer). Therefore, the movable plate 54 is inhibited from deformation without being thick-walled more than necessary in its inside peripheral portion. Thus, desired vibration damping effect will be effectively attained during input of low-frequency, large-amplitude vibration while achieving reduced cost and reduced weight.

An embodiment of the present invention has been described in detail above, but the present invention is not limited to those specific descriptions. For example, the outside peripheral abutting portion 64 of the movable plate 54 illustrated in the preceding embodiment includes the abutting sloping faces 66, the inside peripheral abutting faces 68, the outside peripheral abutting faces 70, the sealing faces 72, the support projections 74, the separated recesses 76, and the abutting projections 78. However, the movable plate 54 is not limited to the construction incorporating all of these components. As long as the abutting sloping faces 66 that extend so as to slope relative to the abutted sloping faces 62 are provided, the other components could be desirably selected and employed. Moreover, no particular limitation is imposed as to the number or position of each component.

Also, while the movable plate 54 according to the preceding embodiment has a thin-walled flat-plate configuration in its center section, it is not always necessary for the movable plate 54 to be made thinner in its center section rather than in its outside peripheral portion. For example, the center section of the movable plate 54 may have approximately the same thickness dimension as the inner peripheral edge of the outside peripheral abutting portion 64 in the plate thickness direction. Besides, if the center section of the movable plate 54 is made thick-walled or the like so that the absorption of the fluid pressure due to deformation of the movable plate 54 is sufficiently kept to a minimum during abutment of the movable plate 54 against the inside wall face of the housing space 46, the rigid movable plate body 56 could be omitted. Furthermore, the configuration of the movable plate body 56 is not limited in any particular way, but the movable plate body 56 may have a configuration that varies in thickness for instance, or its plane configuration may be an irregular configuration.

Besides, it will suffice for the abutted sloping faces 62 of the housing space 46 and the abutting sloping faces 66 of the movable plate 54 to slope relative to each other so as not to abut against each other entirely at one time. That is, the abutted sloping faces 62 and the abutting sloping faces 66 need not necessarily extend with unchanging slope angle, but could instead have curving contours in a vertical cross sectional view such that their slope angles progressively vary.

What is claimed is:

1. A non-compressible fluid-filled type vibration damping device comprising:
    a first mounting member;
    a second mounting member having a tubular shape;
    a main rubber elastic body elastically connecting the first and second mounting members;
    a partition member having a housing space and supported by the second mounting member;
    a pressure-receiving non-compressible fluid chamber situated at one side of the partition member in an axial direction and whose wall is partially defined by the main rubber elastic body;
    an equilibrium non-compressible fluid chamber situated at another side of the partition member in the axial direction and whose wall is partially defined by a flexible film;
    an orifice passage interconnecting the pressure-receiving non-compressible fluid chamber and the equilibrium non-compressible fluid chamber; and
    a movable plate that receives on one side thereof a non-compressible fluid pressure of the pressure-receiving non-compressible fluid chamber and on another side thereof a non-compressible fluid pressure of the equilibrium non-compressible fluid chamber, and adapted to absorb pressure fluctuations in the pressure-receiving non-compressible fluid chamber through tiny displacement,
    wherein:
    the movable plate is housed within the housing space of the partition member so that an amount of displacement of the movable plate is limited by abutment of the movable plate against inside wall faces of the housing space;
    abutted sloping faces are defined by outside peripheral portions of the inside wall faces of the housing space that are situated in opposition in the axial direction and that slope axially outside going towards an inner peripheral side;
    an outside peripheral abutting portion formed of a rubber elastic body is provided to an outside peripheral portion of the movable plate, and abutting sloping faces are defined by opposite faces of the outside peripheral abutting portion that slope axially outside going towards the inner peripheral side; and
    when the movable plate is displaced, the outside peripheral portions of the inside wall faces of the housing space contacts the outside peripheral abutting portion of the moving plate at a point from which the abutted sloping faces of the housing space and the abutting sloping faces of the movable plate have different slope angles so as to slope relative to each other.

2. The non-compressible fluid-filled type vibration damping device according to claim 1, wherein a support projection that projects in a thickness direction is provided at an outside peripheral edge of the outside peripheral abutting portion of the movable plate, and the support projection is clasped between the abutted sloping faces of the housing space.

3. The non-compressible fluid-filled type vibration damping device according to claim 1, wherein an abutting projection that projects in a thickness direction is provided in the outside peripheral abutting portion of the movable plate, and a distance between a projecting distal end of the abutting projection and the abutted sloping face facing the abutting projection is smaller than a distance between other portions of the outside peripheral abutting portion and the abutted sloping face.

4. The non-compressible fluid-filled type vibration damping device according to claim 1, wherein a separated recess that opens onto at least one of the abutting sloping faces is formed in the outside peripheral abutting portion of the movable plate, and a distance between a bottom face of the separated recess and the abutted sloping face facing the separated recess is greater than a distance between other portions of the outside peripheral abutting portion and the abutted sloping face.

5. The non-compressible fluid-filled type vibration damping device according to claim 1, wherein a sealing face that extends in an annular form in a circumferential direction is provided at an outside peripheral end edge of the outside peripheral abutting portion of the movable plate, and through displacement of the movable plate, the sealing face is adapted to abut against the inside wall face of the housing space facing the sealing face about an entire circumference.

6. The non-compressible fluid-filled type vibration damping device according to claim 1, wherein the movable plate comprises a rigid movable plate body and the outside peripheral abutting portion anchored to an outside peripheral portion of the movable plate body.

7. The non-compressible fluid-filled type vibration damping device according to claim 6, wherein the movable plate body of the movable plate is covered by a rubber elastic body that is integrally formed with the outside peripheral abutting portion, and the movable plate is made thinner in an inside peripheral portion rather than in the outside peripheral portion to which the outside peripheral abutting portion is provided.

8. The non-compressible fluid-filled type vibration damping device according to claim 1, wherein:
   the housing space is partially defined by a housing recess formed in a diametrical center section of the partition member, the housing recess including cylindrical sidewall that is axially disposed between the upper and lower abutted sloping faces of the housing space,
   the movable plate includes an outside cylindrical face located diametrically outer most part of the movable plate and axially disposed between the upper and lower abutting sloping faces of the movable plate, and
   the outside cylindrical face of the movable plate is diametrically spaced away from the cylindrical sidewall of the housing recess with a gap therebetween.

9. The non-compressible fluid-filled type vibration damping device according to claim 1, wherein at least four support projections each projecting in a thickness direction are provided at an outside peripheral edge of the outside peripheral abutting portion of the movable plate, at respective circumferential locations, and the four support projections are spaced from each other, and clasped between the upper and lower abutted sloping faces of the housing space.

10. The non-compressible fluid-filled type vibration damping device according to claim 1, wherein the movable plate is displaced rather than deformed by the non-compressible fluid pressure.

* * * * *